US008462841B2

(12) United States Patent
Schlanger et al.

(10) Patent No.: US 8,462,841 B2
(45) Date of Patent: Jun. 11, 2013

(54) SYSTEM, METHOD AND DEVICE TO ENCODE AND DECODE VIDEO DATA HAVING MULTIPLE VIDEO DATA FORMATS

(75) Inventors: Erik Schlanger, Austin, TX (US); Brendan Donahe, Lago Vista, TX (US); Eric Devolder, Cedar Park, TX (US); Rens Ross, Austin, TX (US); Sandip Ladhani, Austin, TX (US); Eric Swartzendruber, Round Rock, TX (US)

(73) Assignee: NetLogic Microsystems, Inc., Irvine, CA (US)

( * ) Notice: Subject to any disclaimer, the term of this patent is extended or adjusted under 35 U.S.C. 154(b) by 1061 days.

(21) Appl. No.: 11/967,690

(22) Filed: Dec. 31, 2007

(65) Prior Publication Data

US 2009/0168899 A1 Jul. 2, 2009

(51) Int. Cl.
*G06K 9/46* (2006.01)

(52) U.S. Cl.
USPC .......................................... 375/240; 382/234

(58) Field of Classification Search
USPC ............... 375/240.2, 240.12, 240.18, 240.23, 375/240.24, 240.25, 240.29; 382/103, 128, 382/131, 199, 225, 286, 234, 294
See application file for complete search history.

(56) References Cited

U.S. PATENT DOCUMENTS

| 5,861,864 | A | | 1/1999 | Jensen |
| 6,075,918 | A | * | 6/2000 | Strongin et al. .............. 386/326 |
| 6,326,984 | B1 | | 12/2001 | Chow et al. |
| 6,778,221 | B1 | * | 8/2004 | Nishioka et al. .............. 348/459 |
| 7,605,868 | B2 | * | 10/2009 | Kondo et al. .................. 348/555 |
| 7,634,011 | B2 | * | 12/2009 | Sullivan .................... 375/240.28 |
| 2002/0057363 | A1 | * | 5/2002 | Todate et al. .................. 348/441 |
| 2002/0152369 | A1 | * | 10/2002 | Wise et al. ..................... 712/300 |
| 2003/0156652 | A1 | * | 8/2003 | Wise et al. ............... 375/240.26 |
| 2003/0206588 | A1 | * | 11/2003 | Etoh et al. ................ 375/240.13 |
| 2003/0215012 | A1 | * | 11/2003 | Etoh et al. ................ 375/240.12 |
| 2004/0028141 | A1 | | 2/2004 | Hsiun et al. |
| 2004/0179607 | A1 | * | 9/2004 | Tao .......................... 375/240.25 |
| 2004/0252759 | A1 | * | 12/2004 | John Winder et al. ... 375/240.12 |
| 2005/0018915 | A1 | * | 1/2005 | Sumioka et al. .............. 382/234 |

(Continued)

FOREIGN PATENT DOCUMENTS

WO WO 2009/085788 7/2009

OTHER PUBLICATIONS

PCT/US2008/087084 International Search Report, Feb. 10, 2009, 4 pages.

(Continued)

*Primary Examiner* — Michael Thier
*Assistant Examiner* — Prince A Mensah
(74) *Attorney, Agent, or Firm* — Sterne, Kessler, Goldstein & Fox, P.L.L.C.

(57) ABSTRACT

A video processing device (150) includes a bitstream accelerator module (106) and a video processing engine (108). The bitstream accelerator module (106) has an input for receiving a stream of encoded video data, and an output adapted to be coupled to a memory (112) for storing partially decoded video data. The bitstream accelerator module (106) partially decodes the stream of encoded video data according to a selected one of a plurality of video formats to provide the partially decoded video data. The video processing engine (108) has input adapted to be coupled to the memory (112) for reading the partially decoded video data, and an output for providing decoded video data.

19 Claims, 5 Drawing Sheets

U.S. PATENT DOCUMENTS

| | | | |
|---|---|---|---|
| 2005/0025241 A1* | 2/2005 | Sullivan et al. | 375/240.12 |
| 2005/0123057 A1* | 6/2005 | MacInnis et al. | 375/240.25 |
| 2005/0201631 A1* | 9/2005 | Kondo et al. | 382/254 |
| 2005/0226324 A1* | 10/2005 | Ouyang et al. | 375/240.12 |
| 2005/0259688 A1* | 11/2005 | Gordon | 370/477 |
| 2006/0165164 A1 | 7/2006 | Kwan et al. | 375/240 |
| 2006/0165181 A1 | 7/2006 | Kwan et al. | 375/240.24 |
| 2006/0222000 A1* | 10/2006 | Vannerson et al. | 370/465 |
| 2007/0133692 A1* | 6/2007 | Reddy et al. | 375/240.25 |
| 2007/0153907 A1* | 7/2007 | Mehta et al. | 375/240.24 |
| 2007/0201559 A1 | 8/2007 | He | |
| 2007/0253491 A1 | 11/2007 | Ito et al. | |
| 2009/0123081 A1* | 5/2009 | DeLuca | 382/234 |
| 2009/0168893 A1 | 7/2009 | Schlanger et al. | 375/240.24 |
| 2010/0053181 A1 | 3/2010 | Schlanger et al. | 345/531 |
| 2010/0054339 A1 | 3/2010 | Schlanger et al. | 375/240.25 |

OTHER PUBLICATIONS

U.S. Appl. No. 11/967,697, filed Dec. 31, 2007, entitled "System, Method and Device for Processing Macroblock Video Data".

* cited by examiner

SYSTEM, METHOD AND DEVICE TO ENCODE AND DECODE VIDEO DATA HAVING MULTIPLE VIDEO DATA FORMATS

CROSS-REFERENCE TO RELATED APPLICATION(S)

The present application is related to U.S. patent application Ser. No. 11/967,697, entitled "System, Method and Device for Processing Macroblock Video Data," invented by Erik Schlanger and Rens Ross, and filed of even date herewith and assigned to the assignee hereof.

FIELD OF THE DISCLOSURE

The present disclosure relates to video processing and more particularly to a system, method and device to encode and decode video data having multiple video data formats.

BACKGROUND

High-definition (HD) signals typically require a high-definition television or other devices in order to be viewed. With an aspect ratio of 16:9 (1.78:1), HD video approaches current aspect ratios of regular widescreen film recorded at typically 1.85:1 or 2.40:1 (sometimes traditionally quoted at 2.35:1). Standard-definition (SD) video differs from HD video having an aspect ratio of 4:3 (1.33:1). Numerous video standards and formats have emerged to output HD and SD video. However, each format presents unique characteristics and specifications. As such, decoding and encoding digital video can be limited by processing capabilities of video processing systems.

BRIEF DESCRIPTION OF THE DRAWINGS

The present invention will hereinafter be described in conjunction with the following drawing figures, wherein like numerals denote like elements, and.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

According to one aspect, a video processing device includes a bitstream accelerator module and a video processing engine. The bitstream accelerator module has an input for receiving a stream of encoded video data, and an output adapted to be coupled to a memory for storing partially decoded video data. The bitstream accelerator module partially decodes the stream of encoded video data according to a selected one of a plurality of video formats to provide the partially decoded video data. The video processing engine has an input adapted to be coupled to the memory for reading the partially decoded video data, and an output for providing decoded video data.

According to another aspect, one of a plurality of video formats is selected. In response to selecting a first video format, a stream of encoded video data is processed according to the first video format using a bitstream accelerator module to provide partially decoded video data in a predetermined output format. In response to selecting a second video format, the stream of encoded video data is processed according to the second video format using the bitstream accelerator module to provide the partially decoded video data in the predetermined output format. The partially decoded video data is processed to provide output video data.

According to a further aspect, a video processing system includes a host processor, a memory, a bitstream accelerator module, and a video processing engine. The host processor is operable to detect a request to process a stream of encoded video data received from a video source, wherein the stream of encoded video data is represented in a first video format. The memory is operable to store the stream of encoded video data. The bitstream accelerator module is responsive to the host processor to process the stream of encoded video data according to a selected one of a plurality of different video formats to provide partially decoded video data, and to store the partially decoded video data in the memory. The bitstream accelerator module is operable to use one of a plurality of firmwares corresponding to the first video format. The video processing engine is configured to access the memory to further process the partially decoded video data.

Figure 1:
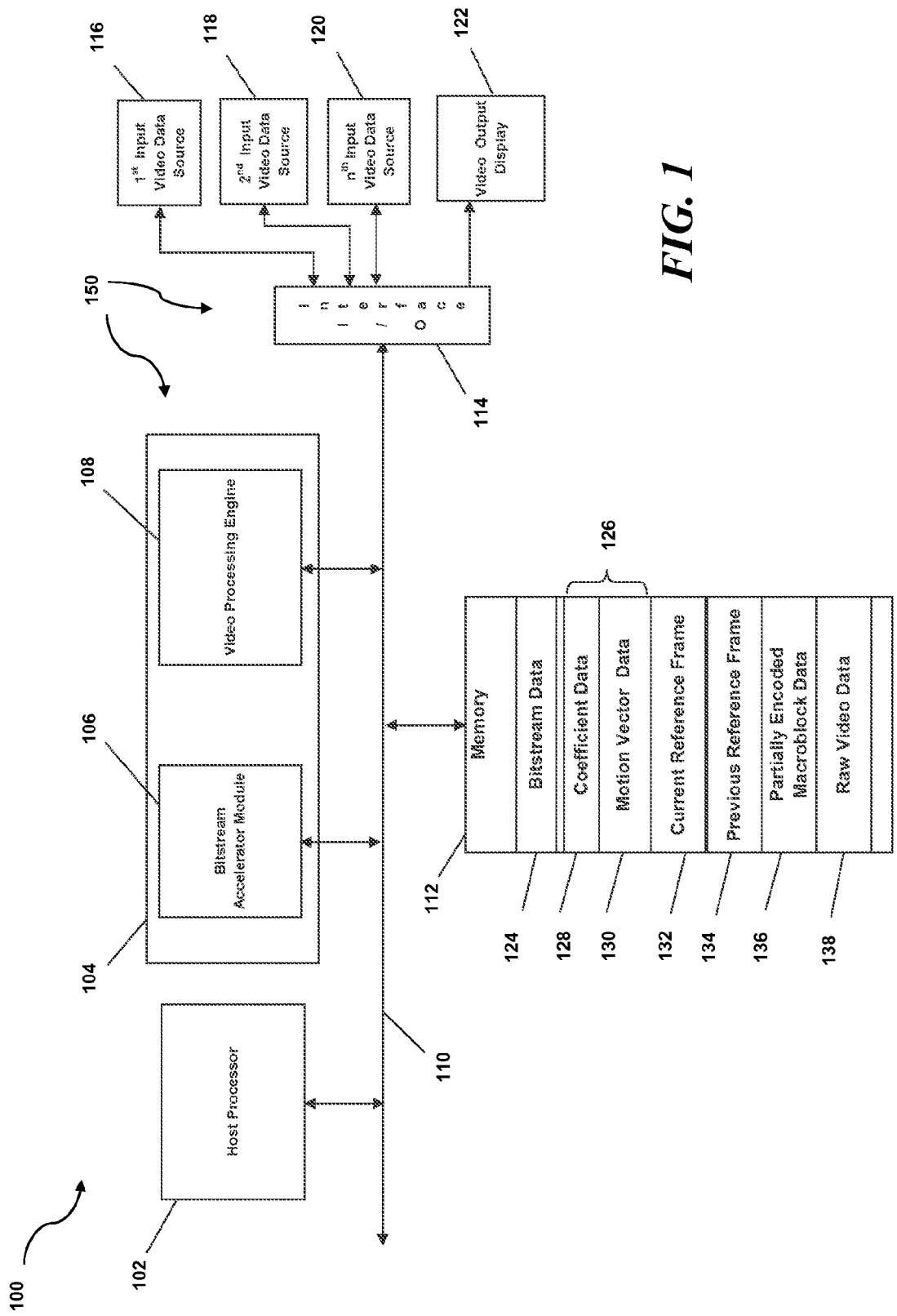
FIG. 1 is a block diagram of a video processing system according to one embodiment of the present invention.

Now turning to the drawings, FIG. 1 is a block diagram of a video processing system 100 according to one embodiment of the present invention. Video processing system 100 can be used as part of a handheld electronic device, a computer system, a portable digital video player, a set-top video box, a digital video recorder, a video module or video card, or various other devices or systems, and such system can incorporate all, or portions of, video processing system 100.

Video processing system 100 processes video data in various video and audio formats, including, but not limited to, MPEG ("Moving Pictures Expert Group") 1, 2, and 4, MJPEG ("Motion JPEG"), DV ("Digital Video"), WMV ("Windows Media Video"), RM ("Real Media"), DivX, Sorenson 3, Quicktime 6, RP9, WMV9, Ogg, Ogg Theora, Dirac, H.264, MP3, WMA, or various other formats and coder/decoder specification (codecs). In particular video processing system 100 has an architecture that allows it to efficiently process video data in a variety of different formats, and to divide up the video processing task among different resources that are capable of performing their assigned tasks most efficiently.

Video processing system 100 includes generally a memory 112, a first input video data source 116, a second input video data source 118, and an n input video data source 120, a video output display 122, and a video processing device 150. Each input video data source 116, 118, and 120 can be a different type of video source, such as a digital video disk (DVD), a digital cable signal, a satellite broadcast signal, an Internet Protocol (IP) signal, a hard disk drive (HDD) storing digital video data, a removable flash drive or various memory modules configured to store digital video data, a digital video recorder, a digital camera including digital video recording capabilities, or various other video sources or combinations of digital video sources.

Video output display 122 is a display device that presents video and/or audio information in a form perceptible to a human, and can be realized with any of a number of display types including cathode ray tube (CRT), liquid crystal display (LCD), plasma display, and the like.

Memory 112 is operably connected to video processing device 150. In one form, memory 112 is implemented as a Double-Data-Rate Synchronous Dynamic Random Access Memory (DDR SDRAM) module that can be configured in various sizes, and can operate at one or more speeds (e.g. 133 MHz, 266 MHz, etc.). Memory 112 can be implemented with other types of memory such as static RAM, asynchronous DRAM, single data rate SDRAM, graphics double data rate (gDDR) SDRAM, and the like. When combined with an integrated memory controller, memory 112 is part of a larger memory module that facilitates read and write accesses to various memory locations within the memory.

Memory 112 includes several areas for storage of data in formats useful for decoding or encoding video data that could be in any of a variety of different video formats. Briefly, memory 112 includes a bitstream data area 124, a macroblock 126 formed by a coefficient data area 128 and a motion vector data area 130, a current reference frame area 132, a previous reference frame area 134, a partially encoded macroblock data area 136, and a raw video data area 138. Video processing device 150 uses these areas to facilitate the decoding and encoding tasks in a manner that will be described more fully below.

Video processing device 150 includes generally a host processor 102, a multiple format video processing engine (MFVPE) 104, a data bus 110, and an input/output (I/O) interface 114. In the illustrated embodiment, all the components of video processing device 150 are combined on a single integrated circuit. In an alternate embodiment memory 112 may also be combined on the same integrated circuit.

Host processor 102 operates as the central processing unit (CPU) of video processing system 100. Host processor 102 is capable of running an operating system and various software applications to control the processing of digital video data using MFVPE 104. In response to a video processing software application, host processor 102 issues requests to MFVPE 104 to process a video data stream according to a selected video format.

MFVPE 104 includes generally a bitstream accelerator module 106 and a video processing engine 108. Bitstream accelerator module 106 and video processing engine 108 are each connected to a data bus 110 and are operable to enable access to memory 112 and other resources coupled to data bus 110 through I/O interface 114. Application software running on host processor 102 is capable of flexibly using bitstream accelerator module 106 and video processing engine 108 to either decode an encoded video data stream, or encode raw video data.

As will be described more particularly with reference to FIG. 5 below, bitstream accelerator module 106 includes its own dedicated processor, separate from host processor 102, which is responsive to firmware corresponding to the selected video format, as well as hardware acceleration circuits for use by the dedicated processor. Bitstream accelerator module 106 includes internal memory for storing different sets of firmware, or "firmwares," corresponding to each supported video format, allowing bitstream accelerator module 106 to be updated from time to time to include revised or new video formats and codecs when available.

Moreover offloading the decoding (and encoding) tasks from host processor 102 and separating various tasks between bitstream accelerator module 106 and video processing engine 108 allows video processing device 150 to perform computationally intensive video decoding (and encoding) tasks efficiently. In particular bitstream accelerator module 106 performs tasks that relate to processing data received as (or provided as) a stream of encoded video data, in which the processing is generally sequential. Video processing engine 108, however, operates on sections of video data known as "macroblocks" that utilize video information from horizontally and vertically adjacent neighbor macroblocks of a video frame to recover the video information for a particular macroblock. Video processing engine 108 uses macroblocks that are not necessarily sequentially adjacent to an area of video information being decoded. Thus, bitstream accelerator module 106 and video processing engine 108 process the macroblocks in different orders based on their own assigned processing tasks.

Input/output (I/O) interface 114 is operable to connect input video sources 116, 118, and 120 and video output display 122 to data bus 110. I/O interface 114 is configurable to interface data bus 110 with one or more types of communication buses such as a universal serial bus (USB), a USB 2.0 bus, a personal computer interconnect (PCI) bus, a PCI-Express bus, a "FireWire" bus, a digital video bus, an iSCSI bus, and Ethernet, Gigabit Ethernet, or various other communication buses.

When decoding a stream of encoded video data, bitstream accelerator module 106 reads the data from memory 112, partially decodes it, and returns partially decoded video data to memory 112. Bitstream accelerator module 106 partially decodes the data by parsing and entropy decoding it. The algorithm for the parsing and entropy decoding operation is stored in the particular firmware that corresponds to the selected video format. Host processor 102 selects this video format and corresponding firmware by writing to a control register of bitstream accelerator module 106. To facilitate subsequent use by video processing engine 108, bitstream accelerator module 106 stores the partially decoded data in macroblock form using a common output format that remains constant between different video formats. Thus video processing engine 108 can efficiently read the macroblock data in the common output format regardless of the selected video format.

When encoding a stream of raw video data, video processing engine 108 reads the raw video data and encodes it to form partially encoded macroblocks. Bitstream accelerator module 106 reads the partially encoded macroblocks from memory 112, entropy encodes them, and outputs a stream of encoded video data to memory 112.

Bitstream accelerator module 106 and video processing engine 108 communicate indirectly through the use of shared memory within memory module 112, and through reading and writing a control register, not illustrated in FIG. 1.

For example, the bitstream accelerator module 106 can load a first firmware to decode a first bitstream having a first format. Bitstream accelerator module 106 decodes the first bitstream and outputs the first bitstream as partially decoded macroblock data to memory 112. Upon detection of a request to decode a second bitstream data type, bitstream accelerator module 106 loads a different firmware that enables it to decode the second bitstream data type. The second bitstream data type is decoded into a format that is the same or similar to the partially decoded macroblock data, and stored within memory 112. In this manner video processing engine 108 can access memory 112, and read the partially decoded macroblocks using the same (or substantially the same) format, thereby reducing the processing needed to output decoded video data.

Bitstream accelerator module 106 writes partially decoded macroblock data to the memory module 112 in multiple regions before video processing engine 108 further processes the macroblock to output decoded video data. Video processing engine 108 generates decoded video data without having specific knowledge of the order that the bitstream accelerator module 106 decoded the bitstream data.

Bitstream accelerator module 106 writes a series of partially decoded macroblocks to memory 112 using a macroblock map or table to allow arbitrary ordering. As such, bitstream accelerator module 106 writes partially decoded macroblock data to various locations within memory 112 and is not bound to a specific memory location or range of memory locations. As such, the bitstream accelerator module 106 processes the bitstream data before video processing engine 108 outputs decoded video data, thereby reducing latency in processing the bitstream data to generate decoded video data.

Video processing system 100 can process video data having different video data formats and output decoded video data to the video output display 122. For example, the first input video data source 116 can be configured to input multiple digital video data files, with each digital video data file having the same digital video data format such as an standard definition (SD) digital video data format. In another form, the second input video data source 116 provides video data in a high definition (HD) digital video data format, such as an H.264 digital video data format. Thus video processing system 100 detects the type of video data format and initiates decoding of that specific type of video.

For example, a bitstream is loaded within memory 112, and MFVPE 104 subsequently processes the bitstream using bitstream accelerator module 106 and video processing engine 108. The MFVPE 104 including the bitstream accelerator module 106 can accelerate processing of bitstreams by performing bitstream parsing and entropy decode/encode portions of a video decode process for various video formats. The bitstream accelerator module 106 decodes macroblock data and outputs the partially decoded macroblock data in a format that can be efficiently processed by the video processing engine 108. For example, the bitstream accelerator module 106 can store or access various video specification data. The video specification data can define fields having formatted data, information for a specific type of video, syntax element, coefficient data, motion vector data, or various other specification data for a specific type of bitstream.

Host processor 102 reads header information to identify a firmware to be employed by the bitstream accelerator module 106. For example, the bitstream accelerator module 106 can access a specific codec to process an identified bitstream having a specific video format that can be decoded using a specific codec. Upon processing using this codec at the bitstream accelerator module 106 to generate partially decoded macroblock data, the partially decoded macroblocks can be written to the memory module 112 and accessed by the video processing engine 108.

Video processing engine 108 includes a hardwired processor that reads and writes video data to and from memory 112, and performs macroblock decoding and encoding functions to output a current frame of video data. For example, the partially decoded macroblock data output by bitstream accelerator module 106 can be translated into a format configured to enable efficient decoding and encoding of the video data using video processing engine 108. The partially decoded macroblock data can be stored within memory module 112 and accessed using video processing engine 108 including the hardwired processor. In this manner, additional firmware, software, etc. need not be loaded into the video processing engine 108 prior to processing the partially decoded macroblock data allowing for efficient processing of macroblock data by the video processing engine 108.

Thus MVFPE 104 can be used as a multi-standard video processor operable to support decoding up to HD resolution video and encoding up to SD resolution video. MVFPE 104, and various portions such as bitstream accelerator module 106, video processing engine 108, or combinations thereof, can be clocked at various speeds and in one form can be clocked at a speed of at least 200 MHz to ensure that the performance of MVFPE 104 is sufficient to process SD and HD video data. For example, NTSC SD video includes a resolution of 720×480 at a frame rate of 30 frames per second (480 p) and includes 1,350 macroblocks of video data per frame, and 40,500 macroblocks of video data per second. PAL SD video is configured with a larger resolution of video having a lower frame rate, resulting in the same macroblock rate as NTSC SD video. As such, MVFPE 104 can be configured to operate at a given clock frequency sufficient to process a macroblock in less than 4,938 cycles.

Figure 2:
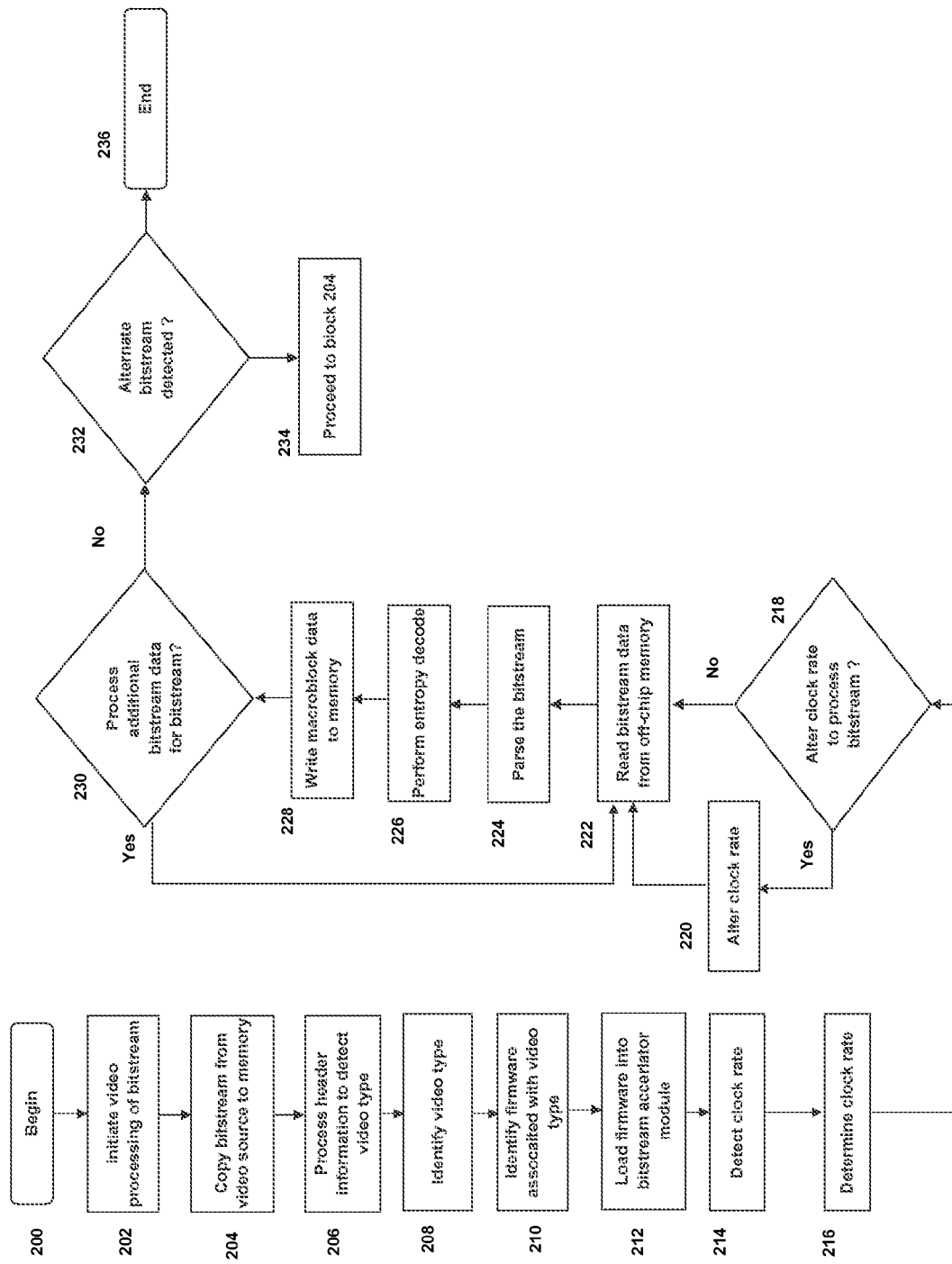
FIG. 2 is a flow diagram for a method of partially decoding an encoded video data bitstream used by the bitstream accelerator module of FIG. 1.

FIG. 2 is a flow diagram for a method of partially decoding an encoded video data bitstream used by bitstream accelerator module 106 of FIG. 1. The method begins at block 200. At block 202 processing of bitstream video data is initiated. At block 204, a bitstream in the form of encoded video data is copied from a video source to memory module 112. Upon copying the bitstream (or a portion thereof) to memory module 112, the method proceeds to block 206 in which header information of the bitstream is processed to determine a video type or format, which is identified at step 208. Then, at block 210, a firmware associated with the selected video type is identified using the header information of the bitstream. Upon identifying the video type and its corresponding firmware, the method proceeds to block 212, in which the appropriate firmware is loaded into bitstream accelerator module 106. The method then proceeds to block 214, which detects a clock rate. For example, a current clock rate of bitstream accelerator module 106 and video processing module 108 is detected. Then block 216 determines a clock rate sufficient to process the bitstream. Decision block 218 determines whether the clock rate should be altered to accommodate the processing needs of the selected bitstream. If so then the clock rate is altered at block 220. For example, the bitstream may be an HD bitstream that requires a relatively high clock rate, and the clock rate may be increased at block 220. Alternatively the bitstream data may be an SD bitstream and the clock rate may be decreased at block 220 to conserve power, processor use, etc. as desired.

Upon altering or maintaining a clock rate, the method proceeds to block 222 in which the bitstream is read from off-chip memory by bitstream accelerator module 106. Proceeding to block 224, bitstream accelerator module 106 parses the bitstream data by separated it into smaller portions or elements. For example, the bitstream parsing process determines a syntax element in the bitstream, and extracts the correct number of bits from the bitstream to represent for the specific syntax element. The dedicated processor in bitstream accelerator module 106 parses the bitstream into syntax elements according to the firmware previously loaded at step 212. The firmware can issue requests to specialized processing circuits to assist with decoding syntax elements. The method then proceeds to block 226, in which bitstream accelerator module 106 performs entropy decode.

Then at block 228 bitstream accelerator module 106 writes the partially decoded video data to memory 112 in the form of macroblocks. For example, bitstream accelerator module 106 outputs macroblocks that include coefficient information (e.g. runs and levels), motion vectors, header information, and various combinations thereof, to memory 112.

The method then proceeds to decision block 230, which determines if additional bitstream video should be processed. If additional bitstream data of the current bitstream, or the same bitstream type, is available to be processed, the method returns to block 222 and repeats the parsing and decoding process. If at decision block 230, additional bitstream data is not available to process, then the method proceeds to decision block 232, which determines whether another bitstream is available to process. If another bitstream is available, flow returns to block 204. If another bitstream is not available, the method ends at block 236.

Figure 3:
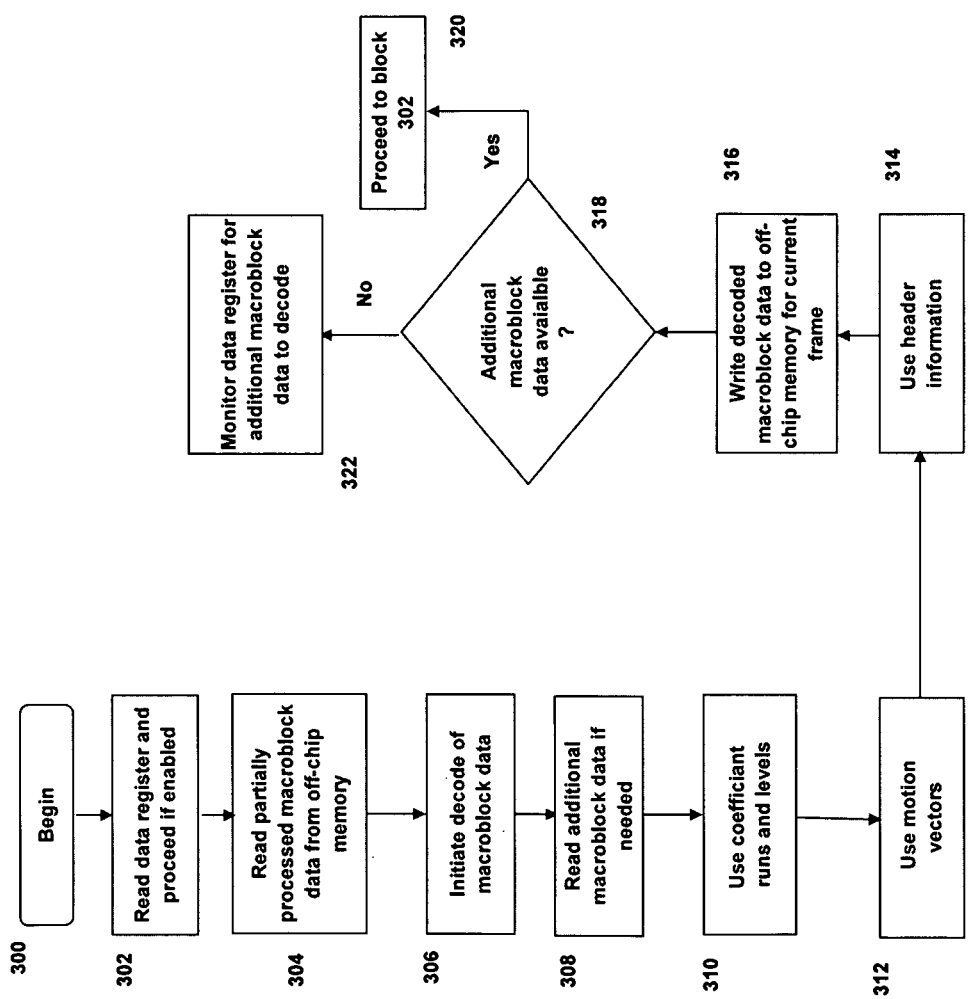
FIG. 3 is a flow diagram for a method of decoding partially decoded video data used by the video processing engine of FIG. 1.

FIG. 3 is a flow diagram for a method of decoding macroblock data used by video processing engine 108 of FIG. 1. Video processing engine 108 can implement the method of FIG. 3 using software or firmware running on a general purpose processor, special purpose circuitry, or various combinations thereof.

The method begins generally at block 300. At block 302, video processing engine 108 reads a control register to determine whether to begin a decoding operation. For example, host processor 102 or bitstream accelerator module 106 initiates the decoding operation by writing to the control register. At block 304, video processing engine 108 accesses memory module 112 to read partially decoded macroblock data, which it will further decode to generate decoded video data to output as a video frame. After reading the partially decoded macroblock data, video processing engine 108 initiates further decoding of the partially decoded macroblock data at block 306. In order to further decode the macroblock data for a current macroblock location, video processing engine 108 may require additional macroblock data from neighboring locations within the frame that have already been decoded. Accordingly video processing engine 108 reads this additional macroblock data from one or more previously generated macroblock locations within the video frame as needed. Video processing engine 108 uses coefficient runs and levels of the partially decoded macroblock at step 310, and uses motion vectors for the current macroblock frame at step 312. Then at block 314 it uses header information, and at block 316 it writes the decoded macroblock data to memory 112 as video data of a current frame. The current frame is populated with previously decoded macroblock data, if any, and is updated with new macroblocks as they are decoded by video processing engine 108.

The method then proceeds to decision block 318, which determines whether additional partially decoded macroblock data is available to be decoded. If so, the method proceeds to block 320 which repeats the flow starting at block 304. If not, the method proceeds to block 322 at which video processing engine 108 monitors the control register for additional macroblock data to decode.

Figure 4:
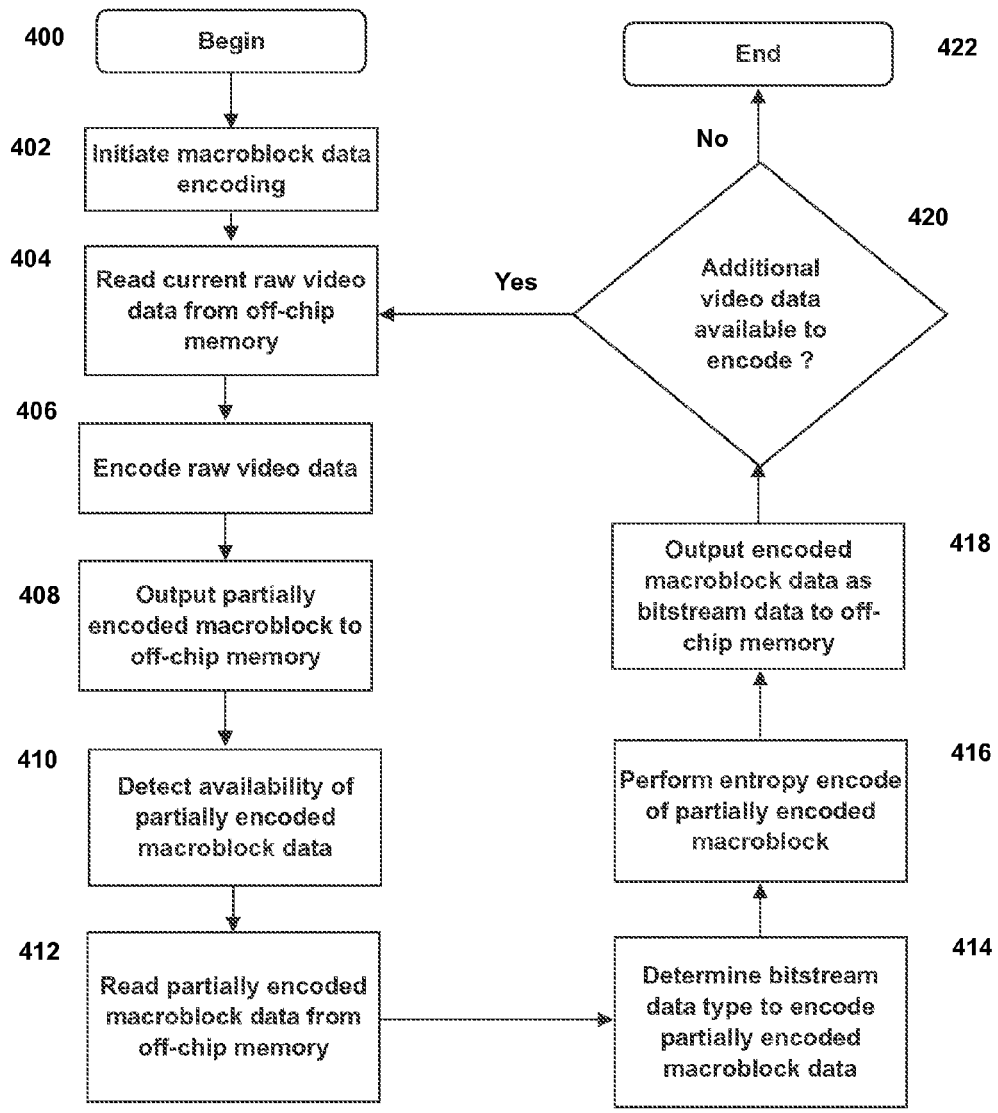
FIG. 4 is a flow diagram for a method of encoding raw video data using the video processing engine and the bitstream accelerator module of FIG. 1.

FIG. 4 is a flow diagram for a method of encoding raw video data using video processing engine 108 and bitstream accelerator module 106 of FIG. 1. The method begins generally at block 400. At block 402, video processing engine 108 initiates macroblock data encoding to convert raw video data into encoded macroblocks. The method next proceeds to block 404 in which video processing engine 108 reads raw video data from memory 112. At block 406 video processing engine 108 encodes the raw video data to form partially encoded macroblock data. Then at block 408 it outputs the partially encoded macroblock data to memory module 112. At block 410 bitstream acceleration module 106 detects the availability of partially encoded macroblock data for encoding. Either host processor 102 or video processing engine 108 sets a control register in bitstream accelerator module 106 to indicate that partially encoded macroblock data is available to be encoded.

Upon detecting an availability of the partially encoded macroblock data, at block 412 bitstream accelerator module 106 reads the partially encoded macroblock data from memory 112. Then at block 414 it determines a video data type which it then uses to encode the partially encoded macroblock data.

The method then proceeds to block 416 at which bitstream accelerator module 416 performs entropy encoding of the partially encoded macroblock. Then at block 418 it outputs the encoded macroblock data as bitstream data to memory 112. At decision block 420 bitstream accelerator module 106 determines whether additional video data is available to encode. If so, the method returns to block 404 and repeats. If not, the method ends at block 422.

Figure 5:
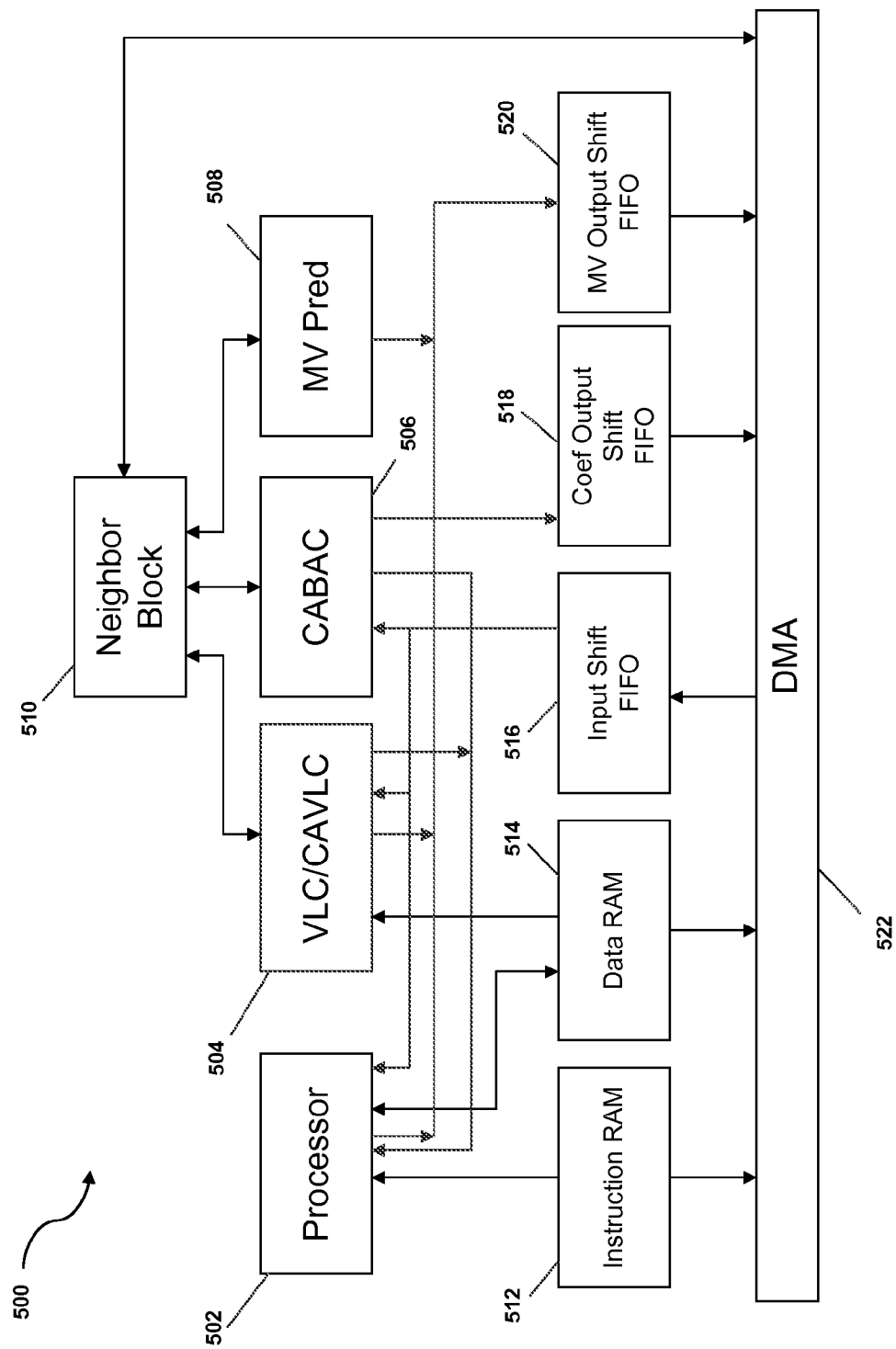
FIG. 5 is a functional block diagram of the bitstream accelerator module of FIG. 1.

FIG. 5 is a functional block diagram of a bitstream accelerator module 500 that may be used to implement bitstream accelerator module 106 of FIG. 1. Generally bitstream accelerator module 500 includes a processor 502, a Variable Length Code (VLC)/context adaptive VLC (CAVLC) engine 504, a context adaptive binary arithmetic coding (CABAC) engine 506, a Motion Vector (MV) predictor engine 508, a neighbor block engine 510, an instruction RAM buffer 512, a data RAM buffer 514, an input shift first in first out (FIFO) buffer 516, a coefficient output shift FIFO buffer 518, and an MV output shift FIFO buffer 520. Each buffer 512, 514, 516, 518, and 520 and neighbor block engine 510 are coupled to a direct memory access (DMA) controller 522 that may be configured to access remote memory autonomously through an interface to data bus 110 (not shown in FIG. 5).

Processor 502 is a dedicated processor that includes several features that give it the flexibility to perform different video codecs efficiently. It has a three-stage execution pipeline, is capable of performing up to one instruction per cycle, and operates with a register file having thirty-two 16-bit registers. The instruction set of processor 502 includes both general-purpose data processing instructions and specialized instructions that are particularly useful for video decoding and encoding operations. The instruction set also supports both 8- and 16-bit data types.

Processor 502 has an input coupled to Instruction RAM 512 for receiving instructions that are part of the selected codec firmware. It also has a bidirectional connection to Data RAM 514 that it uses as a high-speed scratchpad area. Processor 502 also has an input connected to input shift FIFO 516, and an output connected to MV output shift FIFO 520.

Processor 502 is bidirectionally connected to VLC/CAVLC engine 504 and CABAC engine 506 and controls these specialized processing circuits to efficiently implement the selected video processing codec. VLC/CAVLC engine 504 converts variable-length code words into corresponding values or run-level pairs. VLC/CAVLC engine 504 supports multiple levels of tables to allow flexibility in describing the number of bitstream bits each table can decode. As such, increases in performance can be realized and compacting the tables can occur thereby conserving space within data RAM buffer 514. For example, VLC tables can range from 1 to 8 bits from a bitstream at a time. As such, the "wider" the VLC table (e.g. 8 bits), the more quickly the VLC/CAVLC engine 504 can resolve code words (but the more data RAM buffer space is used). Conversely, the "narrower" the VLC table, the more compact the table (but the more VLC cycles needed to resolve code words).

CABAC engine 506 performs syntax element decoding, including calculations for various high definition processes. CABAC engine 506 references items in neighbor block engine 510 when performing context adaptive arithmetic that forms the "ctxIdx" calculations. CABAC engine 506 can also perform an entire loop for extracting coefficients from the bitstream and offloads the task of decoding macroblock coefficients from processor 502.

In response to host processor 102 programming a control register (not shown in FIG. 5), processor 502 loads specialized codec firmware into the instruction RAM buffer 512 and the data RAM buffer 514. The codec firmware includes instructions associated with decoding a stream of encoded video data, encoding a stream of raw video data, or both. Processor 502 performs bit-stream parsing for syntax elements. Bitstream data is provided to the bitstream accelerator module 500 through the input shift FIFO buffer 516. The input shift FIFO buffer 516 also provides bitstream data to the CABAC module 506, and the VLC/CAVLC module 504.

DMA controller 522 implements a "ping-pong" DMA operation with input shift FIFO buffer 516 that allows a first portion of input shift FIFO 516 to be loaded while contents of a second portion of the input shift FIFO 516 can be accessed for processing. Input shift FIFO 516 can be managed or loaded by an external processor. In the illustrated embodiment, processor 502, VLC/CAVLC engine 504, and CABAC engine 506 have a direct interface to the input shift FIFO buffer 516 to process bits from the bitstream buffers.

Coefficient output shift FIFO 518 and MV output shift FIFO 520 are written by the VLC/CAVLC engine 504, CABAC engine 506, and processor 502. If FIFOs 518 and/or 520 become full, bitstream accelerator module 500 stalls further writing will stall until room becomes available.

Thus bitstream accelerator module 500 supports the efficient bitstream processing of video data during both the decoding of encoded video data, and encoding of partially encoded macroblocks. It includes a dedicated processor that is especially adapted for video processing applications, as well as a variety of hardware modules that support the movement of data from and back to memory and various video processing functions.

While the invention has been described in the context of a preferred embodiment, various modifications will be apparent to those skilled in the art. For example, various portions of the description herein describe decoding video data. However, it should be understood that one skilled in the art can use the teachings of the invention to decode and encode video data, audio data, or any combination thereof. Accordingly, it is intended by the appended claims to cover all modifications of the invention that fall within the true scope of the invention.

What is claimed is:

1. A video processing device comprising;
    a bitstream accelerator module having an input configured to receive a stream of encoded video data in a first video format or a second video format, and an output configured to access a memory, in which the memory is configured to store intermediate video data, wherein the bitstream accelerator module is configured to decode the stream of encoded video data from multiple formats and is configured to decode the stream of encoded video data in the first or second video formats to provide the intermediate video data in a common output video format; and
    a video processing engine configured to access the memory to read the intermediate video data, in which the video processing engine is configured to decode the intermediate video data that is in the common output video format to generate video data in the first or second video formats, wherein the bitstream accelerator is configured to:
    detect a neighbor macro block of a first macro block location;
    read a portion of the neighbor macro block from the memory;
    use the portion of the neighbor macro block to generate a first macro block corresponding to the first macro block location; and
    write the first macro block to the memory.

2. The video processing device of claim 1, wherein the bitstream accelerator module comprises an embedded processor responsive to a first request to decode the stream of encoded video data in the first video format using a first firmware, and to a second request to decode the stream of encoded video data in the second video format using a second firmware.

3. The video processing device of claim 1, wherein the bitstream accelerator module is further configured to store the intermediate video data as a plurality of macro blocks.

4. The video processing device of claim 1, wherein the video processing engine is further configured to determine a process to further decode the intermediate video data according to the first or second video formats.

5. The video processing device of claim 1, wherein the bitstream accelerator module and the video processing engine are located on a single integrated circuit.

6. The video processing device of claim 5, wherein the memory is external to the single integrated circuit.

7. The video processing device of claim 1, wherein the bitstream accelerator module is further configured to:
    parse and entropy decode a first bitstream stored within the memory to provide the intermediate video data; and
    write the intermediate video data to the memory.

8. The video processing device of claim 1, wherein:
    the bitstream accelerator module is further configured to process the stream of encoded video data in the first video format to provide the intermediate video data in the common output video format; and
    the bitstream accelerator module is further configured to process the stream of encoded video data in the second video format to provide the intermediate video data in the common output video format, and to write the intermediate video data to the memory in the common output video format.

9. The video processing device of claim 1, wherein:
    the bitstream accelerator module is further configured to store the intermediate video data in a first order; and
    the video processing engine is further configured to process the intermediate video data in a second order different from the first order.

10. A method of processing video data comprising:
    selecting one of a plurality of video formats;
    in response to selecting a first video format, processing a stream of encoded video data according to the first video format using a bitstream accelerator module to provide intermediate video data in a common output video format, wherein the bitstream accelerator module decodes the stream of encoded video data from multiple formats;

in response to selecting a second video format, processing the stream of encoded video data according to the second video format using the bitstream accelerator module to provide the intermediate video data in the common output video format;
decoding the intermediate video data that is in the common output video format to provide video data in the first or second video formats;
detecting a neighbor macro block of a first macro block location;
reading a portion of the neighbor macro block from a memory;
using the portion of the neighbor macro block to generate a first macro block corresponding to the first macro block location: and
writing the first macro block to the memory.

11. The method of claim 10, further comprising:
in response to selecting the first video format, processing the stream of encoded video data in the bitstream accelerator module using a first firmware; and in response to selecting the second video format, processing the stream of encoded video data in the bitstream accelerator module using a second firmware.

12. A method of processing video data comprising:
selecting one of a plurality of video formats;
in response to selecting a first video format, processing a stream of encoded video data according to the first video format using a bitstream accelerator module to provide intermediate video data in a common output video format, wherein the bitstream accelerator module decodes the stream of encoded video data from multiple formats;
in response to selecting a second video format, processing the stream of encoded video data according to the second video format using the bitstream accelerator module to provide the intermediate video data in the common output video format;
decoding he intermediate video data that is in the common output video format to provide video data in the first or second video formats;
in response to selecting the first video format processing the stream of encoded video data in the bitstream accelerator module using a first firmware;
in response to selecting the second video format, processing the stream of encoded video data in the bitstream accelerator module using second firmware;
parsing and entropy decoding the stream of encoded video data using the first firmware to provide the intermediate video data; and
writing the intermediate video data to a memory in the common output video format.

13. A method of processing video data comprising:
selecting one of a, plurality, of video formats;
in response to selecting a first video format, processing a stream of encoded video data according to the first video format using a bitstream accelerator module to provide intermediate video data in a common output video format, wherein the bitstream accelerator module decodes the stream of encoded video data from multiple formats;
in response to selecting a second video format, processing the stream of encoded video data according to the second video format using the bitstream accelerator module to provide the intermediate video data in the common output video format;
decoding the intermediate video data that is in the common output video format to provide video data in the first or second video formats;
in response to selecting the first video format, processing the stream of encoded video data in the bitstream accelerator module using a first firmware;
in response to selecting the second video format, processing the stream of encoded video data in the bitstream, accelerator module using a second firmware;
parsing and entropy decoding the stream of encoded video data using the second firmware to provide the intermediate video data; and
writing the intermediate video data to the memory in the common output video format.

14. The method of claim 13, further comprising:
detecting a request to process the intermediate video data stored within the memory;
reading the intermediate video data from the memory;
processing the intermediate video data to generate a decoded macro block; and
writing the decoded macro block to the memory.

15. A method of processing video data comprising:
selecting one of a plurality of video formats;
in response to selecting a first video format, processing a stream of encoded video data according to the first video format using a bitstream accelerator module to provide intermediate video data in a common output video format, wherein the bitstream accelerator module decodes the stream of encoded video data from multiple formats;
in response to selecting a second video format, processing the stream of encoded video data according to the second video format using the bitstrearm accelerator module to provide the intermediate video data in the common output video format;
decoding the intermediate video data that is in the common output video format to provide video data in the first or second video formats;
reading raw video data from a memory;
encoding the raw video data to generate a partially encoded macro block;
writing the partially encoded macro block to the memory;
entropy encoding of the partially encoded macro block using the bitstream accelerator module; and
outputting an encoded bitstream to the memory.

16. A video processing system comprising:
a host processor configured to detect a request to process a stream of encoded video data received from a video source, wherein the stream of encoded video data is represented in a first video format or a second video format;
a memory configured to store the stream of encoded video data;
a bitstream accelerator module responsive to the host processor, configured to process the stream of encoded video data in the first or second video formats to provide intermediate video data in a common output video format and configured to store the intermediate video data in the memory, wherein the bitstream accelerator module decodes the stream of encoded video data from multiple formats; and
a video processing engine configured to access the memory to further decode the intermediate video data that as lithe common output video format to generate video data in the first or second video formats, wherein the bitstream accelerator module is configured to:
detect a neighbor macro block of a first macro block location;
read a portion of the neighbor macro block from the memory;

use the portion of the neighbor macro block to generate a first macro block corresponding to the first macro block location; and write the first macro block to the memory.

17. The video processing system of claim 16, wherein the bitstream accelerator module is further configured to write the intermediate video data to the memory in macro blocks.

18. The video processing system of claim 17, wherein the bitstream accelerator module is coupled to and responsive to the host processor to select one of a plurality of firmwares corresponding to the first video format or the second video format.

19. The video processing system of claim 17, wherein the host processor, the bitstream accelerator module, and the video processing engine are located on a single integrated circuit.

\* \* \* \* \*

UNITED STATES PATENT AND TRADEMARK OFFICE
CERTIFICATE OF CORRECTION

PATENT NO. : 8,462,841 B2  
APPLICATION NO. : 11/967690  
DATED : June 11, 2013  
INVENTOR(S) : Schlanger et al.

Page 1 of 1

It is certified that error appears in the above-identified patent and that said Letters Patent is hereby corrected as shown below:

On the Title Page, Item (75), please replace "Devolder" with --DeVolder--.

In the Claims

Column 9, Line 59, please replace "comprising;" with --comprising:--.

Column 11, Line 15, please replace "block location: and" with --block location; and--.

Column 11, Line 38, please replace "he intermediate" with --the intermediate--.

Column 11, Line 41, please replace "video format processing" with --video format, processing--.

Column 11, Line 53, please replace "a, plurality, of video" with --a plurality of video--.

Column 12, Line 5, please replace "the bitstream," with --the bitstream--.

Column 12, Line 51, please replace "module responsive" with --module, responsive--.

Column 12, Line 60, please replace "as lithe" with --is in the--.

Signed and Sealed this  
Twenty-fourth Day of June, 2014

Michelle K. Lee  
*Deputy Director of the United States Patent and Trademark Office*